United States Patent [19]

Urano

[11] Patent Number: 4,761,870
[45] Date of Patent: Aug. 9, 1988

[54] METHOD FOR MAKING A CAMSHAFT

[75] Inventor: Shigeru Urano, Saitama, Japan

[73] Assignee: Nippon Piston Ring Co., Ltd., Tokyo, Japan

[21] Appl. No.: 82,208

[22] Filed: Aug. 6, 1987

Related U.S. Application Data

[60] Division of Ser. No. 942,036, Dec. 15, 1986, Pat. No. 4,708,029, which is a continuation of Ser. No. 773,189, Sep. 6, 1985, abandoned.

[30] Foreign Application Priority Data

Sep. 11, 1984 [JP]  Japan ................... 59-188925

[51] Int. Cl.$^4$ ............................................. B23P 17/00
[52] U.S. Cl. ................ 29/421.1; 29/156.4 R; 29/523
[58] Field of Search .............. 29/156.4 R, 421 R, 522, 29/523; 72/58, 370, 61, 62; 74/567, 568; 123/90.6; 403/277

[56] References Cited

U.S. PATENT DOCUMENTS

| 2,852,957 | 9/1958 | Breitenstein | 74/567 X |
| 3,447,395 | 6/1969 | Latour | 74/567 |
| 3,845,667 | 11/1974 | Honrath et al. | 74/567 |
| 3,869,938 | 3/1975 | Schlotterback et al. | 74/567 |
| 4,211,192 | 7/1980 | Baumgartner et al. | 74/567 X |
| 4,638,683 | 1/1987 | Ogawa et al. | 74/567 |
| 4,644,912 | 2/1987 | Umeha et al. | 123/90.6 X |

FOREIGN PATENT DOCUMENTS

| 46-7644 | 2/1971 | Japan | 29/523 |
| 132325 | 8/1983 | Japan | 29/421 R |
| 113944 | 6/1984 | Japan | 29/156.4 R |

Primary Examiner—P. W. Echols
Assistant Examiner—Andrew E. Rawlins
Attorney, Agent, or Firm—Finnegan, Henderson, Farabow, Garrett & Dunner

[57] ABSTRACT

A fabricated camshaft having individual lobes mounted on tubular collars that are in turn mounted on an internal tubular member that is expanded between the collars to form bearing journals for the camshaft.

2 Claims, 2 Drawing Sheets

METHOD FOR MAKING A CAMSHAFT

This is a division of application Ser. No. 06/942,036, filed Dec. 15, 1986, now U.S. Pat. No. 4,708,029, which is a continuation of application Ser. No. 06/773,189, filed Sept. 6, 1985 now abandoned.

BACKGROUND OF THE INVENTION

1. Field of the Invention

This invention relates to a camshaft for an internal combustion engine and more particularly to a camshaft fabricated from separate component parts.

2. Description of the Prior Art

There has been increasing demand for lightweight internal combustion engines because of the energy savings they provide. In addition, there is also a demand for highspeed and high-capacity internal combustion engines. With this in mind, attempts have been made to provide camshafts which are not only lightweight but are also high in strength and abrasion resistance. Efforts have also been made to increase the productivity of methods for forming such camshafts.

Although forged camshafts have conventionally been used for carrying relatively low loads, those made of quench-hardened cast iron are generally used as the performance of an engine is increased.

However, a cast iron camshaft has technical disadvantages in that it is generally heavy, it may lose strength during use and may be deflected during use. In addition, defects can occur when a large camshaft is cast and, moreover, quenching techniques require special know-how for providing the chilled surface layer and controlled quench-hardening.

On the other hand, there are known camshafts with cam lobes made of a sintered alloy and a central stem formed of a steel tube having improved strength and decreased weight. In order to manufacture such cam shafts, however, the cam lobes and the stem are subjected to positioning both in the axial direction and the direction of rotation. The lobes are then coupled to the stem but, if defective coupling occurs at any one spot, the assembly will not be usable. Moreover, the manufacture of such a camshaft requires a complex indexing device for determining the position of the lobes in the direction of rotation, as well as in the axial direction. As a result, methods of forming such assemblies have extremely poor productivity.

Japanese Pat. No. 46-7644 discloses the use of a bulge process for manufacturing a camshaft having bearings in principal locations to reduce the weight of the camshaft. Nevertheless, that disclosure relates to only a small single unit camshaft and is not applicable to a large-sized camshaft.

SUMMARY OF THE INVENTION

In view of the foregoing, an object of the present invention is to provide a lightweight, large-sized camshaft suitable for mass production.

To accomplish these and other objects of the invention, there is provided a camshaft comprised of a plurality of cam lobes each having an opening therethrough. The openings in the lobes are aligned generally with the axis of rotation of the lobe. The camshaft further comprises a central lobe supporting member which is in turn comprised of a plurality of tubular collars disposed to fit within the openings in the lobes. The ends of the collars are spaced one from the other to form at least one circumferential gap. A central tubular member is expanded within the collars and is also expanded within the gaps to form bearing journals for the camshaft. Preferably, the collars include a notch on at least one end thereof with the notch being disposed to engage a portion of the central tubular member.

DESCRIPTION OF THE PREFERRED EMBODIMENT

Figure 1:
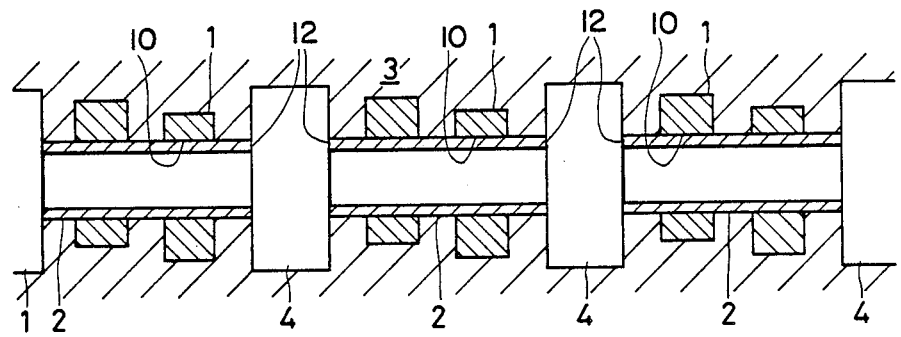
FIGS. 1 through 3 are cross-sectional side views illustrating a means for manufacturing a camshaft embodying the present invention.

Referring now to the drawings, the embodiment of the present invention will be described.

In accordance with the invention, the camshaft includes a plurality of cam lobes each having an opening therethrough. The openings are aligned generally with the axis of rotation of the cam lobe.

As here embodied and depicted in FIG. 1, there are a plurality of cam lobes 1 disposed along the length of the camshaft. As depicted in FIG. 4, the lobes are conventionally configured and they are preferably made of sintered metal. As also depicted in FIGS. 1 through 3, the lobes include an opening 10 that is preferably aligned co-axially with the axis of rotation of the lobe 1.

Figure 2:
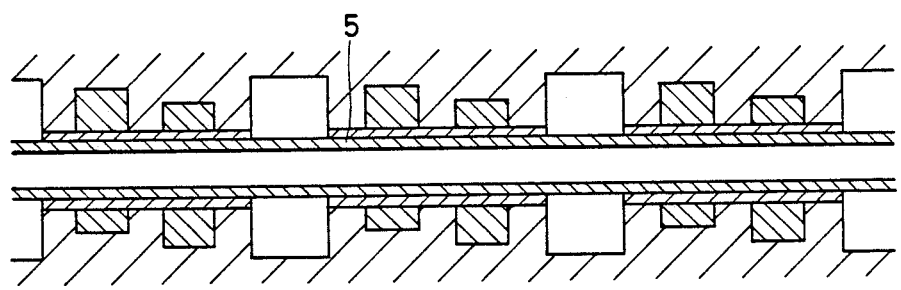
Figure 3:
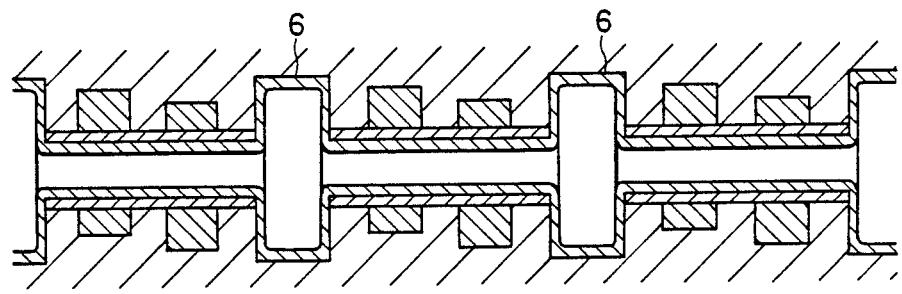
Figure 4:
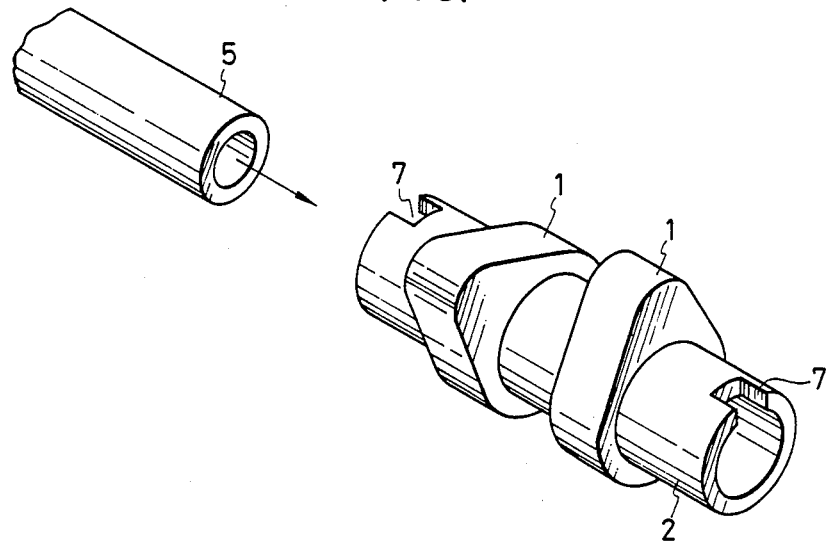
FIG. 4 is a schematic view of another embodiment of a cam shaft utilizing the present invention.

In accordance with the invention, the camshaft includes a central lobe supporting member depicted in FIGS. 2 and 3 as the combination of collars 2 and the central tubular member 5. The collars 2 are disposed to fit within the openings 10 in the lobes 1. As depicted in FIGS. 1 through 3, it is preferred that the ends of the collars be spaced one from the other to form at least one circumferential gap therebetween. Such a gap is depicted as gap 12 in FIG. 1. The camshaft of the present invention further includes a central tubular member here depicted as tubular member 5 that is expanded within the collars 2 to form bearing journals 6 for the camshaft.

Figure 5:
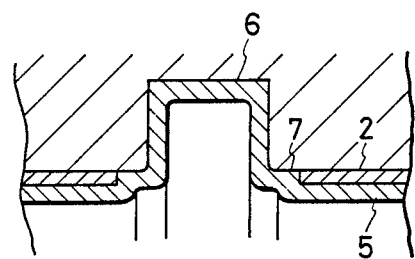
FIG. 5 is a cross-sectional side view of the camshaft of FIG. 4.

It is preferred that the collars include a notch on at least one end thereof with the notch being disposed to engage a portion of the central tubular member. As here embodied and depicted in FIGS. 4 and 5, the notches 7 are disposed on opposite ends of collar 2. As depicted in FIG. 5, when the central tubular member 5 is expanded to form the journal 6, the member 5 also expands into the notch 7 thereby preventing relative motion between the member 5 and the collar 2.

A method of forming the present invention will now be disclosed.

FIG. 1 depicts a plurality of collars 2 with cam lobes 1 fastened to the outer peripheries of the collars arranged in a mold 3 so that axis centers may coincide with one another. The mold, therefore, provides both axial and circumferential positioning of the lobes. The intake and exhaust cam lobes 1 for one cylinder of the engine (not shown) using the camshaft is defined as a unit. There is provided a recess 4 in the mold 3 where a hollow journal (described later) is formed between the collars 2. Each collar 2 is arranged in the mold 3 by passing it through the recess 4.

As shown in FIG. 2, a hollow tubular member 5 is inserted into the plurality of collars 2 fixed in the mold 3 with the axis centers coinciding with one another. In this state, a bulging process is employed wherein pressurized fluid is fed from one end of the mold into the tubular member. The portion of the tubular member facing the recess 4 is forced to expand into the recess 4 as shown in FIG. 3, because the pressurized fluid within the tubular member 5 forces the tubular member 5 to expand outwardly, thereby forming the hollow journal 6. The member 5 and each collar 2 are thereby combined together axially because of the journal 6.

FIGS. 4 and 5 show another camshaft embodying the present invention.

In this embodiment, both ends of the collar 2 include notches 7. Such a collar 2 is fixed within a mold 3 and pressurized fluid is fed into the tubular member 5 as shown in FIG. 3. The portion of the tubular member 5 facing the recess 4 is expanded and a hollow journal 6 is formed. Simultaneously, the portion of the tubular member 5 facing the notch 7 is also expanded into the notch 7. Accordingly, the coupling of the tubular member 5 and the collar 2 is strengthened and at the same time its safety is improved because the two components are locked together such that they cannot rotate with respect to one another.

As set forth above, because the camshaft, according to the present invention, can be made by combining lobes 1 made of sintered alloy with the tubular member 5 and a plurality of collars 2 while simultaneously forming journals, long camshafts can be mass produced without a large sintering furnace. Moreover, the use of the bulging process for forming the hollow journals 6 by causing the tubular member 5 to expand makes possible the manufacture of lightweight camshafts.

Furthermore, since in a preferred embodiment notches 7 are provided at both ends of the collar 2 and part of the tubular member expands into the notch 7, it serves to increase the coupling strength and improve safety as it positively locks the two components together.

The invention has been disclosed in terms of preferred embodiments, but the scope of the invention is not limited thereto. The scope of the invention is determined by the appended claims and their equivalents.

What is claimed is:

1. A method for forming a cam shaft for use in an internal combustion engine, comprising the steps of:
   arranging a plurality of cam lobes each having an opening therethrough, the opening of each said lobe being aligned generally with the axis of rotation of the cam lobe, the axes of rotation of said arranged lobes being aligned with each other;
   inserting one of a plurality of tubular collars to fit within said openings in said lobes;
   spacing the ends of said collars apart from each other to form at least one circumferential gap;
   inserting a central tubular member within said spaced collars; and
   expanding said central tubular member within said circumferential gap to form a bearing journal for said cam shaft.

2. A method according to claim 1 wherein the step of expanding said central tubular member includes the step of expanding said central tubular member in a notch in one end of each of said tubular collars.

* * * * *